Figure 1:
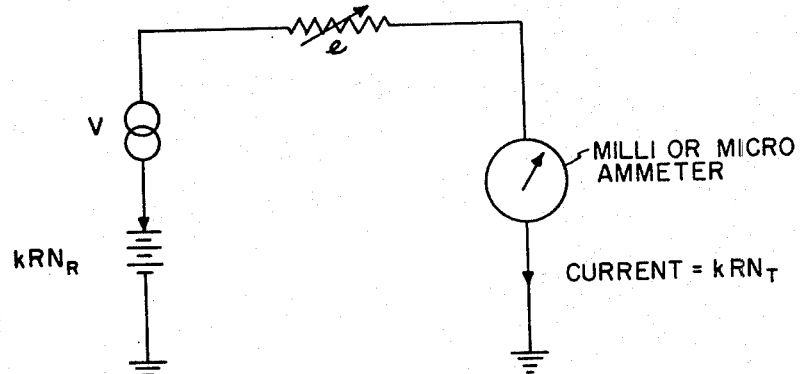

April 20, 1965   R. W. ASTHEIMER   3,179,805
COMBINED RADIOMETER AND EMISSOMETER
Filed July 11, 1962

INVENTOR.
ROBERT W. ASTHEIMER
BY
ATTORNEY

3,179,805
COMBINED RADIOMETER AND EMISSOMETER
Robert W. Astheimer, Westport, Conn., assignor to Barnes Engineering Company, Stamford, Conn., a corporation of Delaware
Filed July 11, 1962, Ser. No. 209,174
5 Claims. (Cl. 250—83.3)

This invention relates to a combined radiometer and emissometer.

In the past a number of radiometers have been designed for measuring the amount of radiation from a distant object. Many of these radiometers operate in the infrared. It is particularly with this type of radiometer that the present invention deals although, as will be pointed out below, the invention is applicable to a different type of radiometer which is not actuated by radiations in the infrared. One of the most important uses for infrared radiometers is to measure temperature. This is done by comparing the signal from a suitable infrared detector when it is irradiated with radiation from the target with a reference source of infrared radiation. This reference source may be a black body maintained at a definite temperature or it may be a black body at ambient temperature and in some cases other reference sources have been used such as radiation from space in the case of radiometers which are mounted on satellites.

Essentially all radiometers may be considered as having some means for directing radiation from the object onto the detector and means for directing radiation from the reference source onto the detector the latter means usually being in the form of a chopper which first reflects one radiation onto the detector and then the other.

A.C. electronic processing circuits are used which are designed to respond to A.C. signals at the chopping frequency. When a separate reference source is used the chopping mechanism ordinarily has one or more reflecting surfaces the reference radiation being reflected during a portion of the chopping and the radiation from the target either passing directly through, in the case of a chopper which is provided with blades, or being reflected in the case of radiometers where the radiation does not enter directly in line with the chopper. When the reference source is to be at ambient temperature it is quite common to have the chopper blades blackened so that they constitute the black body source. Of course, collecting optics are quite common in sensitive radiometers and may be of any desired type. As the present invention has nothing whatever to do with the collecting optics or with the general arrangement of detector, reference source and chopping mechanism these will not be further described in detail or illustrated on the drawings.

A number of problems arise with the ordinary radiometer regardless of whether the reference source is a thermostated black body or whether it is at ambient temperature. Since the problem presented with a thermostated reference source is common to both this will first be described together with its solution by means of the present invention.

The electrical output of the radiometer is the difference between radiation from the target and radiation from the thermostated reference source. If the target were a perfect black body the electrical measurement would be proportional to the fourth power of the absolute temperature of the body and therefore a meter with a suitable scale graduated in the inverse power would give temperature accurately and precisely. Unfortunately such a situation is almost never encountered in practice. Most targets are not perfect black bodies and have emissivities which may be considerably less than unity. In such a case the temperature measurement is not directly readable from the instrument because the signal which the instrument puts out is proportional not only to the fourth power of the temperature of the target but also to its emissivity. In the past actual temperature has only been determined either by computation, when the emissivity is known, or where the measurements are on the same or similar targets having unchanging emissivity a relative temperature measurement is obtained.

According to the present invention the instrument can be adjusted so that if the emissivity is known it will read temperature directly. It is also possible to determine emissivity where it is unknown. In other words, the present invention transforms a radiometer into a true temperature measuring device and also an emissometer.

It is fairly simple to effect adjustments on a radiometer which are proportional, that is to say which will increase or decrease the readings by a certain proportional factor. In such cases the sensitivity of amplifiers and the like can easily be adjusted. Unfortunately such forms of adjustment are incapable of compensating for emissivity. Radiometer detector output, $V_s$, is determined as follows:

$V_s = kR(eN_T - N_R)$
$R$ = detector responsivity
$e$ = emissivity of target (the emissivity of the reference is assumed unity)
$k$ = calibration constant of the instrument which includes the optical gain and field of view.
$N_T$ = target radiance
$N_R$ = reference source radiance $k$ is, of course, a constant and for many measurements responsivity R will also remain constant within the accuracy of the machine. Therefore, both of these terms may be considered as a single constant and will be so treated in the following discussion. They do not alter the nature of the invention. In some instances the range of temperature or changes in ambient temperature may be sufficiently great so that R does not remain a constant. Corrections can be made for this factor as will be described at a later point in this specification after describing the normal and simple instrument of the invention. For the present discussion, therefore, it is assumed that R remains constant during the measurements. Since the term $N_T$ is the quantity which is desired it will be seen that the emissivity is a proportional factor only with respect to this quantity and not with respect to other quantities such as $V_s$ which is the actual detector output. It is thus impossible to provide proportional adjustment of the instrument which directly will give the corrections for emissivity without a difference setup. It is with this difference that the present invention deals and this will be brought out below by a development of a changed form of equation.

$$N_T = \frac{V_s + kRN_R}{e}$$

This still appears to present the same problem because emissivity is a proportional factor to two quantities $V_s$ and $N_R$ but the sum of these is needed to make the temperature measurement.

If it is considered that $N_T$ is to be a reading, for example of a meter, this is a current change and now if $N_R$ could be represented by a voltage it will be apparent that the equation now represents a form similar to Ohms law $I=E/R$. It is now possible by means of the present invention to set up the instrument as a form of analog computer with the meter indication corresponding to the current I a voltage corresponding to $k$ $N_R$ and a resistance corresponding to $e$. $V_s$ is, of course, already a voltage namely the output of the radiation detector, and therefore the final result is that the emissivity can be represented by a resistance in the denominator of the expression.

It is now possible to provide for a proportional control of resistance, a rheostat, to correspond to $e$ and its dial may be marked with a suitable linear scale. The above mathematical simplification does not make the assumption that $kR$ is unity. This will usually be true for an actual instrument, but inasmuch as this constant only applies to $N_R$ in the final equation in which the instrument is set up as an Ohms law analog the provision of a proper voltage to represent this quantity is easily made to include the actual value of the constant. In a similar manner the effect of the constant on the indicator current is taken care of by a suitable adjustment of the indicating meter or other readout device and, of course, the meter may be provided with a scale which is in the form of an inverse $T^4$ scale.

Figure 2:
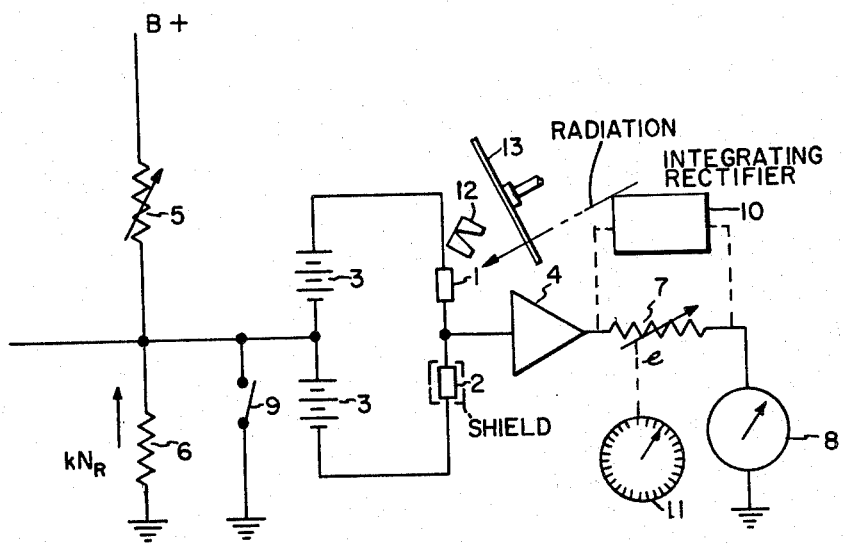

The invention will be described in greater detail in conjunction with the drawings in which:

FIG. 1 is a schematic of the theoretical circuit represented by the present invention, and FIG. 2 is a schematic of a practice device.

In FIG. 1 it will be seen that the quantity corresponding to $N_R$ with its appropriate constant is represented by a battery, the output of the detector by a voltage generator, the current by a meter and the emissivity control by a variable resistor. Now in accordance with Ohms law the current is represented as produced by a voltage consisting of the two voltages $V_s$ and $kRN_R$ in series with variable resistor corresponding to $e$.

While the simple circuit of FIG. 1 is operative it is somewhat inconvenient to use a battery or a battery with a potentiometer across it to vary the voltage applied. A more practical device when used with a conventional thermistor bolometer is illustrated in FIG. 2. Here the thermistor bolometer is composed of an active flake 1 and a compensating flake 2 which is shielded from radiation in the conventional bolometer bridge form. The two thermistor flakes are biased by the two batteries 3 and the output is taken as the differential between the two flakes. Radiation shown by the arrows to the active flake 1 is chopped by a conventional chopper 13, so that alternately radiation from the desired target and from the reference source 12 which is shown as a thermostatted black body or which may be a blackened portion of the chopper, produces an alternating current signal at chopping frequency at the junction of the two flakes which is proportional to the difference between the radiation from the target and the radiation from the source. The output voltage of the detector is normally quite small and so it is customary to amplify it and this is done in a preamplifier shown at 4. The output voltage of the detector must as always be with respect to some potential level and this permits adding the voltage corresponding to $kN_R$. In FIG. 2 this potential point is shown as ground. The output from the preamplifier is proportional to $V_s$. The power supply for the amplifier is provided with a B+ voltage as indicated on the drawings which passes through a voltage divider composed of a variable resistor 5 and a smaller fixed resistor 6. Adjustment of the variable resistor 5 can produce a voltage at the junction between the batteries 3 which is equal to $kRN_R$ and is chopped in synchronism with the radiation by the chopping switch, shown diagrammatically at 9. As this voltage is connected so as to add to the output of the active flake 1 the input to the amplifier 4 now receives $V_s$ plus $kN_R$. The output of the amplifier 4 is proportional to the sum of the two voltages referred to before. It is in the form of alternating current and may be used directly in the present invention or it may be rectified and integrated in order to produce a proportional direct current. In any case the current flows through variable resistor 7 and meter 8. The variable resistor 7 is provided with a dial 11 having a linear scale, the dial being shown with respect to the arrow indicating variability of the resistor on the schematic diagram of FIG. 2. The latter can be an alternating current meter or if the amplifier 4 is provided with rectifying and integrating circuits it may be a direct current meter. In FIG. 2 the rectifying and integrating circuits are shown at 10 in dashed lines as an alternative construction. The rectifying and integrating circuits are conventional in nature and are, therefore, shown as a block. In any event it is apparent that the form of the circuit is the same as in FIG. 1 and the dial of the variable resistor 7 is suitably calibrated in terms of emissivity and the value of the resistor 7 and they must, of course, be adjusted in accordance with meter sensitivity so that the scale on the dial of the rheostat 7 will actually measure emissivity.

In operation let it first be assumed that the emissivity of the target is known and that it is 0.70. The instrument, which was first calibrated with a black body so that the scale on the meter reads temperature correctly, is then pointed at the target, the rheostat adjusted to 0.70 and the meter will now read the temperature which would correspond to black body radiation. In other words, the factor of emissivity is completely eliminated and the instrument will read correct temperature as long as the target retains the particular known emissivity which will usually be the case for considerable time.

The operation of the instrument of the present invention as an emissometer is as follows. The instrument is first pointed at a black body maintained at a known temperature with the emissivity dial turned to 1, or, as it will usually be numbered 100, the instrument should read the correct temperature. Then a sample, the emissivity of which is to be determined, is heated to the same temperature and the instrument pointed at it. The reading will, of course, be lower if, as will usually be the case, the substance in question has an emissivity less than one. Then the emissivity dial is turned until the meter reads the same temperature as it did for the black body. The dial of the emissivity control will then give the emissivity of the material in question. Once this is known the instrument can then be used to measure the temperature of other samples of the material which are not accessible to accurate temperature measurement by other means.

The above description deals with an instrument in which the reference source is a thermostatted black body. Such instruments are very useful but they are also more expensive and much heavier and also they consume more power because usually the thermostatting of the black body reference source takes as much or more power than is needed for operation of the rest of the instrument, particularly when the amplifiers are transistorized. Therefore, a radiometer with a thermostatted reference source does not lend itself readily to portable use.

The present invention, if used with a radiometer in which the chopper itself, for example a blackened blade, is used as a reference source, is subject to errors depending on the ambient temperature because, of course, $V_s$ is the difference between the radiance of the target and the radiance of the reference source and if the corrections made possible by the present invention are to be applied there must be a change in the offsetting voltage for the reference source. This can be made if the dial for the variable resistor 5 is calibrated in terms of temperature and the instrument can then be used as before.

Changes in ambient temperature also present another problem if they are quite substantial. The responsivity of most infrared detectors changes considerably with ambient temperature. This is particularly true of thermistor bolometers. Therefore, if there are changes in ambient temperature which are sufficiently great the readings of the instrument will not be accurate. Since the responsivity of the detector is a proportional factor in $V_s$ it can, of course, be compensated for by a change in gain of the amplifier in which case an additional control is needed with a temperature calibrated dial.

The above corrections which are necessary with unthermostatted reference sources if there is considerable change in ambient temperature can be entirely eliminated for certain uses of the radiometer. For example, suppose that the targets which are to be examined by the radiometer are much hotter than the temperature of the reference source. For example, the targets might be at temperatures quite a few hundred degrees above ambient temperature. In such a case it is possible to avoid correction factors for the radiance of the reference source with change in ambient temperature that is to say changes in $N_R$. The relatively quite hot objects, the temperature of which is being measured, radiate in the visible and the near infrared. However, at ambient temperature a black body does not radiate to any significant extent at such shorter wavelengths, for example within the regions to which a lead sulfide detector responds. In such a case the black body reference source at ambient temperature appears to have almost zero radiance to the detector. Now, of course, the correcting voltage for $N_R$ becomes zero and does not change significantly as the ambient temperature changes. In other words, no corrections need be made for ambient temperature as far as the reference source radiation is concerned. This simplifies the instrument and makes possible an accurate portable radiometer which does not have to have the large power supply necessary for a thermostatted reference source.

Of course, if such a portable radiometer is to be used as an emissometer the calibrating black body and the sample of the material to be tested will both have to be heated up to very much higher temperatures than is the case where the radiation detector of the radiometer is responsive to radiation produced by black bodies at temperatures not too far above ambient. This restriction on the usefulness of the radiometer of the present invention is often not too serious because calibrating black body sources and samples of the material to be tested can easily be heated to quite high temperatures for they are not dependent on the power supply of the radiometers themselves and so it is possible to effect emissivity determinations even with a portable radiometer using detectors that do not respond substantially to radiations from black bodies at ambient temperature. Since the most important field for radiometers is the measurement of materials which are extremely hot and which, therefore, cannot be measured readily by other means, the portable radiometer described above has an extended utility. Obviously, of course, the radiometer may have plug-in detectors or more than one detector with suitable optics so that it can be used over a wide range of temperatures.

The invention has been described particularly in connection with infrared radiometers where it finds its greatest single utility. However, the invention is not limited thereto and may also be used in radiometers usable with radiations of much shorter wavelength. In fact this is the case with the lead sulfide detector modification referred to above.

The use of the instrument as an emissometer is not the only purpose for which this function can be employed. It is possible to use the present invention as a reflectometer in the visible or in the infrared in which case, of course, it is necessary to have a calibrated radiation source and the instrument can then be used to determine the reflectivity of a particular substance. Where emissivity is measured, as in the infrared, reflectivity is sometimes more easily determined by measuring emissivity and substracting it from 100 percent. The present instrument is therefore usable for certain other purposes than the principle one of an accurate temperature radiometer and emissometer.

I claim:
1. In a radiometer comprising a radiation detector which transforms radiation into electrical signals in the form of voltages, a reference radiation source, means for alternately applying radiation to said detector from the object, the temperature of which is to be measured, and from the reference source, the improvement which comprises,
   (a) means for producing a voltage proportional to the radiation of the reference source and for adding said voltage to the signal voltage from the radiation detector,
   (b) a current indicating device, and
   (c) a variable resistance in series with said voltages and said current indicating device, said variable resistance having an indicator dial with a linear scale whereby variations of said variable resistor from full value changes output indications from the current output device in proportion to emissivity of the object measured by the radiometer.
2. A radiometer according to claim 1 in which the output of the radiation detector is an alternating voltage and means are provided for chopping the added voltage proportional to the radiance of the reference source in synchronism with the radiation detector output voltage.
3. A radiometer according to claim 1 in which the detector output is transformed electronically into a direct current voltage and the voltage corresponding to the radiance of the reference source is also a D.C. potential.
4. A radiometer according to claim 3 in which the electronic circuits are provided with a power supply, the radiation detector is a differential detector having an active element and an element subjected to ambient temperature the detector elements being provided with a bias voltage and means are provided for applying a variable portion of the D.C. voltage of the supply for the electronic circuits to said radiation detectors to change their bias and thereby introduce the additional voltage in series with the detector output voltage.
5. A radiometer according to claim 4 in which the radiation detectors are thermistors connected with one thermistor receiving radiation and the other shielded therefrom the two thermistors being connected in a bridge circuit to produce a differential output.

References Cited by the Examiner
UNITED STATES PATENTS

| | | | |
|---|---|---|---|
| 2,927,212 | 3/60 | Shimukonis et al. | 250—83.3 |
| 3,010,102 | 11/61 | Ketchledge et al. | 250—83.3 X |
| 3,057,200 | 10/62 | Wood | 250—83.3 X |

RALPH G. NILSON, *Primary Examiner.*

ARCHIE R. BORCHELT, *Examiner.*